Patented June 14, 1932

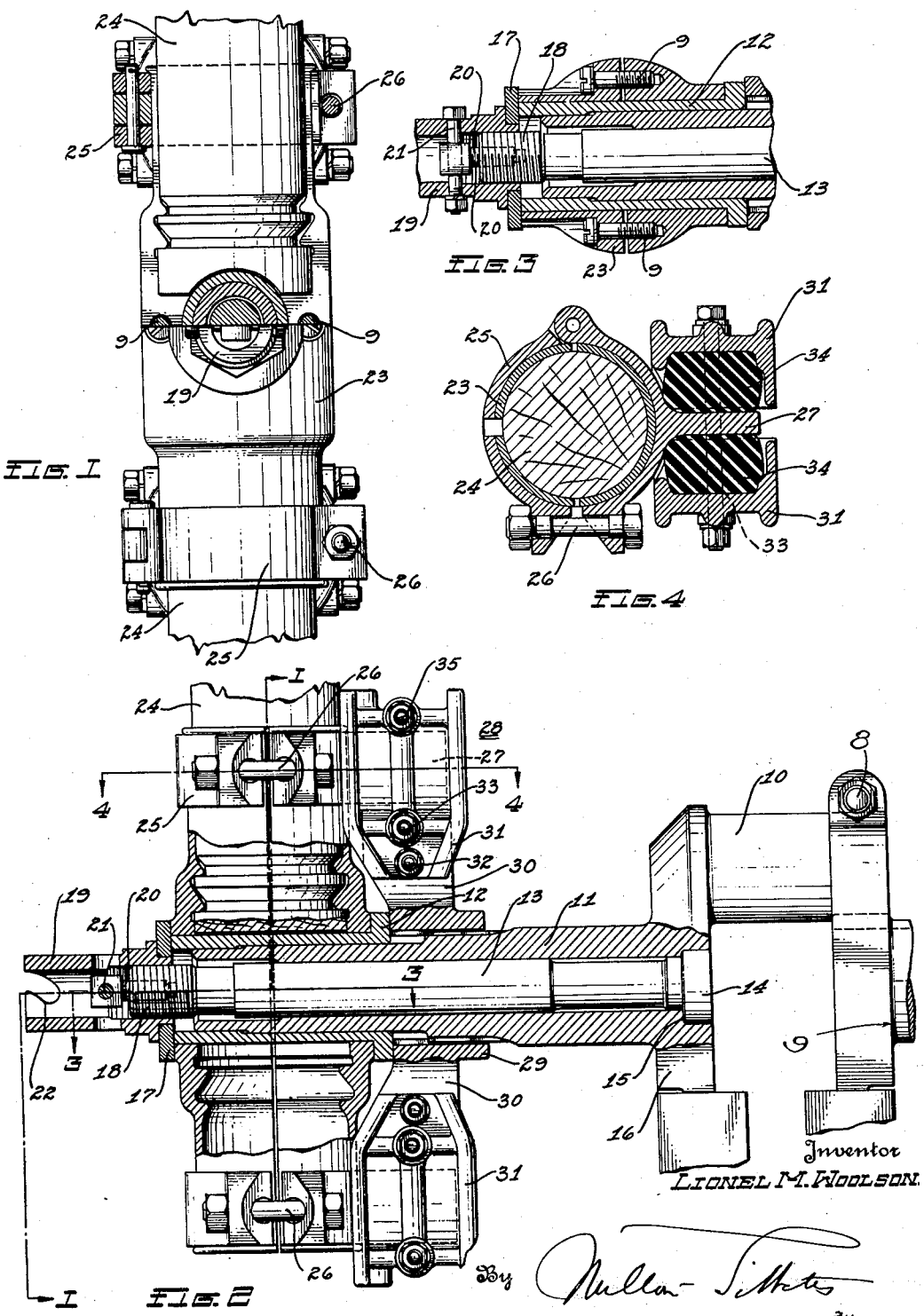

1,863,387

UNITED STATES PATENT OFFICE

LIONEL M. WOOLSON, OF DETROIT, MICHIGAN, ASSIGNOR TO PACKARD MOTOR CAR COMPANY, OF DETROIT, MICHIGAN, A CORPORATION OF MICHIGAN

PROPELLER ATTACHMENT

Application filed September 21, 1929. Serial No. 394,277.

This invention relates to airplanes, and more particularly to propeller driving and mounting mechanism.

An object of my invention is to provide a rugged propeller driving mechanism for airplanes which is capable of withstanding the torsion and shocks developed by engines operating at high compression, such as Diesel engines.

Another object of my invention is to provide a propeller driving mechanism for airplanes in which the propeller is retained axially upon the crankshaft by compression means.

Still another object of my invention is to provide a hollow crankshaft of small cross sectional diameter which is capable of withstanding high torsional stresses and explosive shocks of the character developed by an engine in which the compression pressure is high, such as with Diesel engines.

Other objects of the invention will appear from the following description taken in connection with the drawing, which forms a part of this specification, and in which:

Fig. 1 is an end elevation partly in section and taken on line 1—1 of Fig. 2, illustrating an airplane propeller mechanism incorporating my invention;

Fig. 2 is a side elevation of the same partly broken away along the crankshaft and adjacent thereto to illustrate the mounting and drive for the propeller;

Fig. 3 is a sectional view of the same taken on line 3—3 of Fig. 2;

Fig. 4 is a sectional view taken on line 4—4 of Fig. 2.

Referring now to the drawing by characters of reference, 10 represents a crankshaft, which is adapted to be associated with an internal combustion engine of the radial type, having a hollow end 11 upon which is loosely mounted a bearing 12 arranged to carry the propeller. A rod 13 extends through the interior of the hollow end of the crankshaft, one end of this reinforcing element being formed with an eccentric head 14 which fits into an irregularly shaped recess 15 in the crankcheek 16 to prevent rotation of the rod relative to the crankshaft. A thrust ring 17 is associated with the outer end of the propeller structure and provides a bearing for the front end of the bearing 12 and for the propeller. The outer end 18 of the rod is threaded and a hollow crankshaft extension 19 is screwed thereon to retain the bearing 12 and the propeller axially upon the crankshaft, such bearing 12 and the propeller being loosely mounted upon the hollow end of the crankshaft. The crank shaft is formed with a section 9 which is clamped on the other crank shaft section by bolts 8 in the conventional manner. When the section 9 is detached, the rod 13 can be readily removed from or inserted into the hollow end of the shaft.

Anchor means is provided for securing the shaft extension with the rod in its desired adjusted relation, and such means consists of the bolt 20 which is screwed into the threaded end of the rod, and fixed with the shaft extension 19 by the bolt 21 which extends through an aperture in the head thereof. The forward end of the shaft extension is provided with grooves 22 to provide jaws for the reception of mechanism for rotating the crankshaft to start the engine.

The propeller consists of a hub 23 formed in two sections which are clamped together around the propeller blade stems 24 by two part hinged clamping members 25 which are drawn together by the bolts 26. The clamping sections are also secured together by the bolts 9. The rear clamping sections are provided with extensions 27 through means of which rotation is imparted to the propeller from the crankshaft by a connection designated generally at 28. This driving connection consists of a hub member 29 having oppositely extending arms 30 to each of which is secured a pair of retainer members 31. These retainer members are fixed to the ends of the arms 30 by the bolts 32 and 33. Arranged intermediate the extensions 27 and the associated retainer members are rubber blocks 34 which are clamped in such position by the bolts 33 and by bolts 35. The hub 29 is splined to the crankshaft so that it rotates integrally therewith, and transmits such rotation to the retainer arms 31. The flexible drive connection described absorbs sufficient torsional vibrations to permit the use of a hollow shaft, while the reinforcing member 13 permits the use of a hollow shaft of small diameter with a structure in which the propeller is remotely located relative to the crankcheeks. It is to be noted that this application contains certain of the features to which my copending application Serial No. 386,861, filed August 19, 1929, is directed.

The rod serves to assist in retaining the propeller in axial position upon the crankshaft through association with the shaft extension, arranged for the reception of starting mechanism, and for fixing a thrust member in propeller retaining position. It will be seen that I have provided a drive mechanism for airplanes which is rugged, adapted to support and drive a propeller arranged remotely from the crankcheeks, and in which the propeller can be readily associated and removed from or adjusted axially upon the crankshaft.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

What I claim is:

1. In an airplane propelling mechanism, a crankshaft having a hollow end portion, a rod extending through the hollow end portion of said shaft, a propeller rotatably mounted upon the hollow portion of said shaft, a driving connection between the propeller and the shaft, and retaining means associated with the projecting end of said rod fixing the propeller axially upon said shaft.

2. In an airplane propelling mechanism, a crankshaft having an aperture extending through one end and the adjacent crankcheek and formed irregular at the inner end, a rod extending through the aperture and provided with an irregular head adapted to be seated in the irregular portion of the aperture, a propeller rotatably mounted upon the hollow end of said crankshaft, a driving connection between said propeller and said shaft, and adjustable means associated with the projecting end of said rod fixing the propeller axially on the crankshaft.

3. In an airplane propelling mechanism, a crankshaft having a hollow end portion, a propeller rotatably mounted upon the hollow portion of said crankshaft, a driving connection between said shaft and said propeller, a rod extending through the hollow end portion of said crankshaft, and retainer means fixing the propeller axially upon said shaft, said retainer means being anchored to said rod.

4. In an airplane propelling mechanism, a crankshaft having a hollow end portion, a rod extending through the hollow end portion of said crank shaft, a propeller rotatably mounted upon the end of said shaft, driving mechanism connecting said shaft with said propeller, a thrust member for said propeller, and means anchored to said rod for fixing the position of said thrust member and propeller axially of the crank shaft.

5. In an airplane propelling mechanism, a shaft having a hollow end portion, a rod extending through the hollow end portion of said shaft, a propeller rotatably mounted upon the outer end of the hollow end portion of said shaft, a shaft extension screwed upon the projecting end of said rod, and a thrust member with which said extension engages fixing said propeller axially upon said shaft, said thrust member being carried by said shaft extension.

6. In an airplane propelling mechanism, a shaft having a hollow end portion, a rod extending through and rotatable with the hollow end portion of said shaft, a propeller rotatably mounted upon the outer end of the hollow end portion of said shaft, drive means between the crank shaft and the propeller, a shaft extension adjustable on the rod and fixing the propeller axially of the crank shaft, and means for anchoring said shaft extension to said rod in adjusted position.

7. In an airplane propelling mechanism, a shaft having a hollow end portion, a propeller fixed axially on the hollow shaft end, a rod extending through the hollow end of the shaft and bearing against one end thereof, and means associated with said rod and engaging the propeller in a relation to compress the entire hollow end portion of the shaft axially.

In testimony whereof I affix my signature.

LIONEL M. WOOLSON.